US012429311B1

(12) United States Patent
Slocum et al.

(10) Patent No.: US 12,429,311 B1
(45) Date of Patent: Sep. 30, 2025

(54) AEROSTATS FOR AERIAL PLATFORM ACQUISITION

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 18/435,981

(22) Filed: Feb. 7, 2024

Related U.S. Application Data

(60) Provisional application No. 63/443,782, filed on Feb. 7, 2023.

(51) Int. Cl.
*F41H 13/00* (2006.01)
*B64B 1/40* (2006.01)
(Continued)

(52) U.S. Cl.
CPC .......... *F41H 13/0006* (2013.01); *B64B 1/40* (2013.01); *B64D 7/00* (2013.01); *B64U 10/60* (2023.01);
(Continued)

(58) Field of Classification Search
CPC ...... B64B 1/40; B64U 10/30; B64U 2101/16; B64U 2101/15; B64U 2101/17;
(Continued)

(56) References Cited

U.S. PATENT DOCUMENTS

| 1,925,945 A | 9/1933 | Zielinski et al. |
| 2,742,662 A | 4/1956 | Lyons |

(Continued)

FOREIGN PATENT DOCUMENTS

| CN | 204034673 U | 12/2014 |
| GB | 2356184 A1 | 5/2001 |

(Continued)

OTHER PUBLICATIONS

Godart, P., "Design of an Aluminum-Powered Reverse Osmosis Desalination System for Disaster Relief," Massachusetts Institute of Technology, Dept. of Mechanical Engineering, May 22, 2019 (105 pages).

(Continued)

*Primary Examiner* — Arfan Y. Sinaki
(74) *Attorney, Agent, or Firm* — The Marbury Law Group, PLLC

(57) ABSTRACT

According to one aspect, an aerostat may include an inflatable structure defining a volume, and a payload mechanically coupled to the inflatable structure, the payload including a sensor, an acquisition module, and a controller, the acquisition module operable to generate acquisition energy directable in midair from the payload to an aerial platform flying independently, the controller in electrical communication with the acquisition module and the sensor, the controller configured, based on a signal received from the sensor and associated with flight of the inflatable structure, to operate the acquisition module to direct the acquisition energy to the aerial platform such that independent flight of the aerial platform interruptible by the acquisition energy.

18 Claims, 9 Drawing Sheets

(51) Int. Cl.
*B64D 7/00* (2006.01)
*B64U 10/60* (2023.01)
*B64U 101/16* (2023.01)
*G05D 1/247* (2024.01)

(52) U.S. Cl.
CPC ......... *G05D 1/247* (2024.01); *B64U 2101/16* (2023.01); *F41H 13/005* (2013.01)

(58) Field of Classification Search
CPC ..... B64D 7/00; F41H 13/005; F41H 13/0043; F41H 13/0062
See application file for complete search history.

(56) References Cited

U.S. PATENT DOCUMENTS

| | | |
|---|---|---|
| 3,014,689 A | 12/1961 | Soderstrom |
| 3,204,320 A | 9/1965 | Eckstein et al. |
| 3,225,508 A | 12/1965 | Simon |
| 3,381,655 A | 5/1968 | Rozzelle |
| 3,402,738 A | 9/1968 | Perolo |
| 3,502,298 A | 3/1970 | Paddington |
| 3,575,381 A | 4/1971 | Gilmore |
| 3,878,081 A | 4/1975 | Reding et al. |
| 3,993,595 A | 11/1976 | Merkl |
| 4,024,912 A | 5/1977 | Hamrick et al. |
| 4,050,515 A | 9/1977 | Hamrick et al. |
| 4,084,711 A | 4/1978 | Armstrong |
| 4,134,491 A | 1/1979 | Turillon et al. |
| 4,239,277 A | 12/1980 | Oda |
| 4,264,018 A | 4/1981 | Warren |
| 4,280,288 A | 7/1981 | Corfa et al. |
| 4,358,291 A | 11/1982 | Cuomo et al. |
| 4,446,636 A | 5/1984 | Weinert |
| 4,586,456 A | 5/1986 | Forward |
| 4,770,848 A | 9/1988 | Ghosh et al. |
| 5,240,449 A | 8/1993 | Sloan et al. |
| 5,301,631 A | 4/1994 | Mning |
| 5,372,617 A | 12/1994 | Kerrebrock et al. |
| 5,494,538 A | 2/1996 | Kirillov et al. |
| 5,555,839 A | 9/1996 | Staten et al. |
| 5,605,481 A | 2/1997 | Van Raden |
| 5,620,652 A | 4/1997 | Tack et al. |
| 5,707,499 A | 1/1998 | Joshi et al. |
| 5,732,752 A | 3/1998 | Glessner et al. |
| 6,386,137 B1 | 5/2002 | Riche |
| 6,506,360 B1 | 1/2003 | Andersen et al. |
| 6,648,272 B1 | 11/2003 | Kothmann |
| 7,344,267 B2 | 3/2008 | Carito |
| 7,356,930 B2 | 4/2008 | Wadge et al. |
| 7,503,277 B2 | 3/2009 | Boschma, Jr. et al. |
| 7,540,892 B2 | 6/2009 | Strizki et al. |
| 7,588,087 B2 | 9/2009 | Cafferata |
| 7,803,349 B1 | 9/2010 | Muradov |
| 8,157,205 B2 | 4/2012 | McWhirk |
| 8,340,704 B2 | 12/2012 | Hu |
| 8,418,435 B2 | 4/2013 | Hatoum |
| 8,430,704 B2 | 4/2013 | Jeffrey |
| 8,697,027 B2 | 4/2014 | Uzhinsky et al. |
| 8,864,064 B2 | 10/2014 | DiMarzio et al. |
| 8,974,765 B2 | 3/2015 | Boyle et al. |
| 9,090,323 B1 | 7/2015 | Ratner |
| 9,174,140 B2 | 11/2015 | Nelson et al. |
| 9,346,532 B1 | 5/2016 | Ratner |
| 9,511,844 B1 | 12/2016 | DeVaul |
| 9,545,542 B2 | 1/2017 | Binder |
| 9,619,977 B2 | 4/2017 | Graham et al. |
| 9,624,103 B1 | 4/2017 | Woodall et al. |
| 9,853,360 B2 | 12/2017 | Sylvia et al. |
| 9,902,480 B1 | 2/2018 | Cromie et al. |
| 10,113,534 B2 | 10/2018 | Sia |
| 10,258,950 B2 | 4/2019 | Kmetich et al. |
| 10,556,709 B1 | 2/2020 | Kimchi et al. |
| 10,737,754 B1 | 8/2020 | Farley et al. |
| 10,745,789 B2 * | 8/2020 | Slocum ..................... C23C 2/02 |
| 10,787,268 B2 | 9/2020 | Leidich et al. |
| 10,829,192 B1 | 11/2020 | Farley et al. |
| 10,829,229 B2 | 11/2020 | MacCallum et al. |
| 10,988,227 B2 | 4/2021 | MacCallum et al. |
| 11,047,162 B1 | 6/2021 | Tennessee |
| 11,130,557 B1 * | 9/2021 | Slocum ..................... B64B 1/40 |
| 11,141,671 B2 | 10/2021 | Harter et al. |
| 11,142,318 B2 | 10/2021 | Thrun et al. |
| 11,148,947 B1 | 10/2021 | Slocum et al. |
| 11,203,430 B2 | 12/2021 | Heppe |
| 11,268,180 B2 | 3/2022 | Slocum |
| 11,312,466 B1 | 4/2022 | Slocum et al. |
| 11,318,437 B1 | 5/2022 | Slocum et al. |
| 11,332,366 B2 * | 5/2022 | Slocum ..................... C01B 3/08 |
| 11,358,718 B2 * | 6/2022 | Yoon ......................... B64B 1/50 |
| 11,661,339 B1 | 5/2023 | Mahar et al. |
| 11,772,795 B1 | 10/2023 | Slocum et al. |
| 11,958,585 B1 | 4/2024 | Slocum et al. |
| 2002/0088178 A1 | 7/2002 | Davis |
| 2003/0024323 A1 | 2/2003 | Wang et al. |
| 2003/0062444 A1 | 4/2003 | Goodey |
| 2004/0016613 A1 | 1/2004 | Uemura |
| 2006/0278757 A1 | 12/2006 | Kelleher |
| 2007/0057116 A1 | 3/2007 | Sinsabaugh et al. |
| 2007/0063099 A1 | 3/2007 | Holloman, Jr. |
| 2007/0217972 A1 | 9/2007 | Greenberg et al. |
| 2008/0063597 A1 | 3/2008 | Woodall et al. |
| 2008/0121778 A1 | 5/2008 | Imajou |
| 2008/0193806 A1 | 8/2008 | Kulakov |
| 2009/0208404 A1 | 8/2009 | Itoh |
| 2010/0028255 A1 | 2/2010 | Hatoum |
| 2010/0038477 A1 | 2/2010 | Kutzmann et al. |
| 2010/0112396 A1 | 5/2010 | Goldstein |
| 2010/0230121 A1 | 9/2010 | Hall et al. |
| 2010/0276537 A1 | 11/2010 | Kutzmann et al. |
| 2010/0288875 A1 | 11/2010 | Barnes et al. |
| 2012/0052001 A1 | 3/2012 | Woodall et al. |
| 2012/0100443 A1 | 4/2012 | Braithwaite et al. |
| 2012/0107228 A1 | 5/2012 | Ishida et al. |
| 2012/0223181 A1 | 9/2012 | Ciampa |
| 2012/0318660 A1 | 12/2012 | Cohly et al. |
| 2013/0115544 A1 | 5/2013 | Davidson et al. |
| 2013/0219795 A1 | 8/2013 | Fukumoto |
| 2014/0021288 A1 | 1/2014 | Elson et al. |
| 2014/0075847 A1 | 3/2014 | Konchan |
| 2014/0097289 A1 | 4/2014 | Heppe |
| 2014/0231132 A1 | 8/2014 | Zeren et al. |
| 2014/0231281 A1 | 8/2014 | Young et al. |
| 2014/0261132 A1 | 9/2014 | Zeren et al. |
| 2015/0204486 A1 | 7/2015 | Hoffmann |
| 2015/0258298 A1 | 9/2015 | Satoh et al. |
| 2016/0075422 A1 | 3/2016 | Goldstein |
| 2016/0114862 A1 | 4/2016 | Janik |
| 2016/0159625 A1 | 6/2016 | Janik et al. |
| 2016/0207605 A1 | 7/2016 | Jensen et al. |
| 2016/0257415 A1 | 9/2016 | Ye et al. |
| 2016/0355918 A1 | 12/2016 | Slocum |
| 2017/0022075 A1 | 1/2017 | Ritchie et al. |
| 2017/0022078 A1 | 1/2017 | Fukuoka |
| 2017/0203827 A1 | 7/2017 | Marcum |
| 2017/0355460 A1 | 12/2017 | Shannon et al. |
| 2017/0355462 A1 | 12/2017 | Hoheisel |
| 2018/0237141 A1 | 8/2018 | Heppe |
| 2018/0252504 A1 * | 9/2018 | Takehisa ................. F41H 11/02 |
| 2018/0272898 A1 | 9/2018 | Wojatzki et al. |
| 2018/0274272 A1 | 9/2018 | Woo et al. |
| 2019/0024216 A1 | 1/2019 | Giri et al. |
| 2019/0077510 A1 | 3/2019 | Panas et al. |
| 2019/0079509 A1 | 3/2019 | Bosworth |
| 2019/0185162 A1 | 6/2019 | Prager et al. |
| 2019/0226247 A1 | 7/2019 | Johann et al. |
| 2019/0241271 A1 | 8/2019 | Haugeberg et al. |
| 2019/0341637 A1 | 11/2019 | Fine et al. |
| 2020/0095074 A1 | 3/2020 | Byers et al. |
| 2020/0130833 A1 | 4/2020 | Miller et al. |
| 2020/0156790 A1 | 5/2020 | Von Flotow et al. |
| 2020/0199727 A1 | 6/2020 | Slocum |
| 2020/0199728 A1 | 6/2020 | Slocum |
| 2020/0262536 A1 | 8/2020 | Deakin |

(56) References Cited

U.S. PATENT DOCUMENTS

| | | |
|---|---|---|
| 2020/0361631 A1 | 11/2020 | Leone et al. |
| 2021/0011492 A1 | 1/2021 | Raabe et al. |
| 2021/0061488 A1 | 3/2021 | Smithers et al. |
| 2021/0115547 A1 | 4/2021 | Slocum |
| 2021/0237843 A1 | 8/2021 | Slocum et al. |
| 2021/0276866 A1 | 9/2021 | Meroueh |
| 2022/0041262 A1 | 2/2022 | Slocum et al. |
| 2023/0002026 A1 | 1/2023 | Limpaecher et al. |
| 2023/0150701 A1 | 5/2023 | Yartha et al. |

FOREIGN PATENT DOCUMENTS

| | | |
|---|---|---|
| JP | 2004174301 A | 6/2004 |
| JP | 2004243151 A | 9/2004 |
| WO | 2009034479 A2 | 3/2009 |
| WO | 2015005921 A1 | 1/2015 |
| WO | 2015077225 A1 | 5/2015 |
| WO | 2016196718 A1 | 12/2016 |
| WO | 2021034805 A1 | 2/2021 |
| WO | 2021119628 A1 | 6/2021 |

OTHER PUBLICATIONS

Godart, P., "Mechanisms of Liquid-Metal-Activated Aluminum-Water Reactions and the Application," Massachusetts Institute of Technology, Dept. of Mechanical Engineering, Aug. 6, 2021 (351 pages).

Wikipedia, "USS Macon (ZRS-5)" Feb. 24, 2023 (10 pages).

European Patent Office, "International Preliminary Report on Patentability," issued in related International Patent Application No. PCT/US2020/064953 dated May 17, 2022 (11 pages).

European Patent Office, "International Search Report and Written Opinion," issued in related International Patent Application No. PCT/US2020/064953 dated May 25, 2021 (18 pages).

U.S. Patent and Trademark Office, "Non-Final Office Action," issued in related U.S. Appl. No. 16/804,676 dated Jul. 21, 2021 (17 pages).

U.S. Patent and Trademark Office, "Notice of Allowance and Issue Fee(s) Due," issued in related U.S. Appl. No. 16/804,676 dated Jan. 25, 2022 (25 pages).

U.S. Patent and Trademark Office, "Restriction Requirement," issued in related U.S. Appl. No. 17/233,781 dated Aug. 11, 2022 (5 pages).

U.S. Patent and Trademark Office, "Non-Final Office Action," issued in related U.S. Appl. No. 17/233,781 dated Sep. 26, 2022 (24 pages).

U.S. Patent and Trademark Office, "Final Office Action," issued in related U.S. Appl. No. 17/233,781 dated Apr. 3, 2023 (8 pages).

U.S. Patent and Trademark Office, "Notice of Allowance and Issue Fee(s) Due," issued in related U.S. Appl. No. 17/535,008 dated Dec. 8, 2022 (30 pages).

U.S. Patent and Trademark Office, "Notice of Allowance and Issue Fee(s) Due," issued in related U.S. Appl. No. 17/535,008 dated Apr. 19, 2023 (14 pages).

U.S. Patent and Trademark Office, "Notice of Allowance and Issue Fee(s) Due," issued in related U.S. Appl. No. 17/535,008 dated Aug. 11, 2023 (17 pages).

U.S. Patent and Trademark Office, "Notice of Allowance and Issue Fee(s) Due," issued in related U.S. Appl. No. 17/535,008 dated Nov. 30, 2023 (14 pages).

U.S. Patent and Trademark Office, "Restriction Requirement," issued in related U.S. Appl. No. 17/832,318 dated Aug. 5, 2022 (9 pages).

U.S. Patent and Trademark Office, "Non-final Office Action," issued in related U.S. Appl. No. 17/832,318 dated Oct. 25, 2022 (20 pages).

U.S. Patent and Trademark Office, "Notice of Allowance and Issue Fee(s) Due," issued in related U.S. Appl. No. 17/832,318 dated Mar. 3, 2023 (5 pages).

U.S. Patent and Trademark Office, "Non-final Office Action," issued in related U.S. Appl. No. 18/113,968, dated Jun. 15, 2023 (31 pages).

U.S. Patent and Trademark Office, "Notice of Allowance and Issue Fee(s) Due," issued in related U.S. Appl. No. 18/113,968, dated Jul. 17, 2023 (5 pages).

U.S. Patent and Trademark Office, "Notice of Allowance and Fee(s) Due," issued in related U.S. Appl. No. 18/609,776 dated Mar. 26, 2025 (8 pages).

* cited by examiner

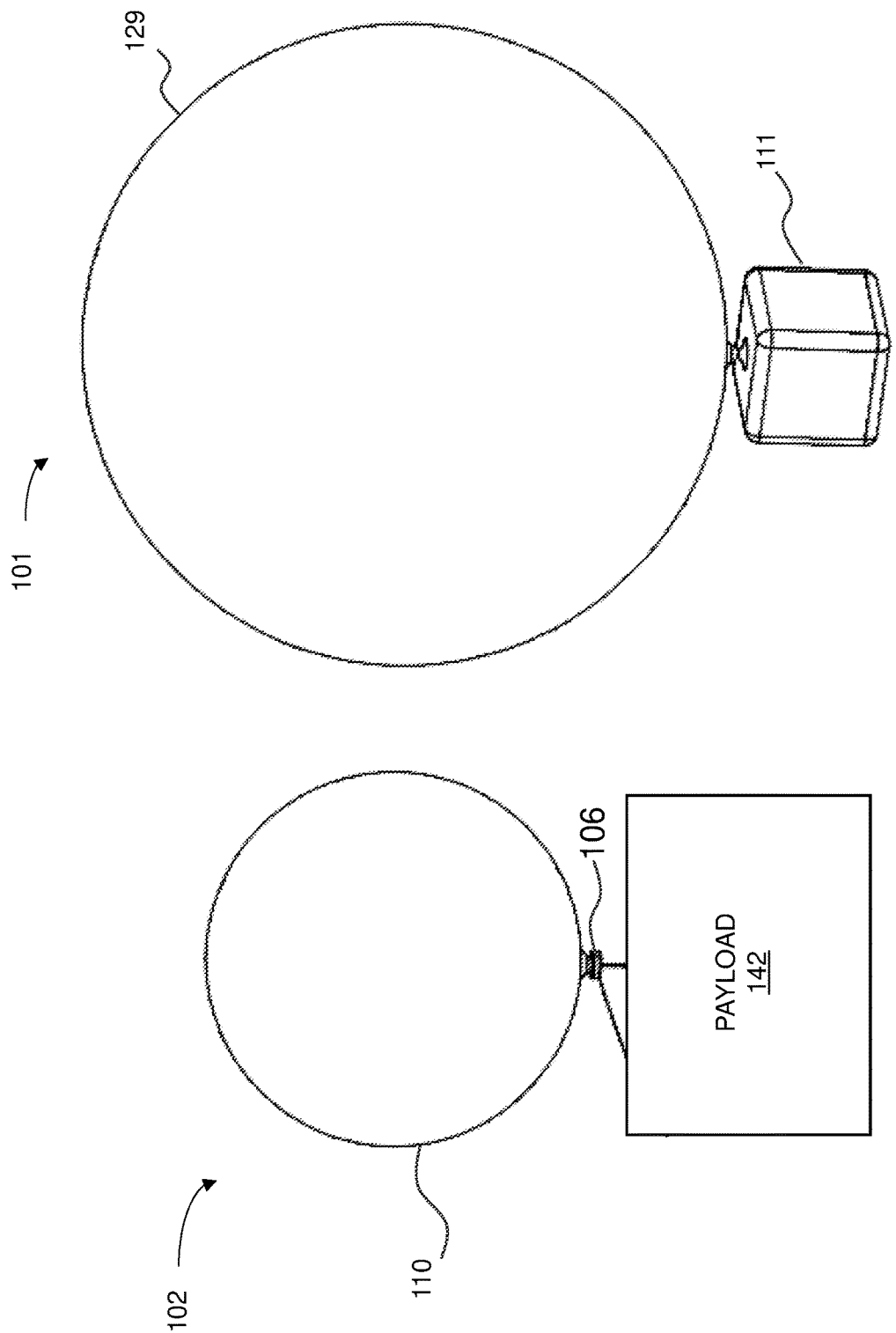

AEROSTATS FOR AERIAL PLATFORM ACQUISITION

CROSS-REFERENCE TO RELATED APPLICATIONS

This application claims priority to U.S. Prov. App. Ser. 63/443,782, filed Feb. 7, 2023, the entire contents of which are hereby incorporated herein by reference.

BACKGROUND

Lighter-than-air platforms (i.e., high altitude balloons) can be used to deploy payload over a vast territory. Sometimes adversarial aerial platforms are deployed over a region, but shooting down such systems can require expensive equipment, may endanger populace below, and/or may cause damage that prevents analysis of components and capabilities of these adversarial aerial platforms. Further, many of these adversarial aerial platforms fly so high (e.g., 60-80 thousand feet) that it is impractical to fly a drone from ground level to approach, destroy, and/or acquire the adversarial aerial platform.

Accordingly, there remains a need for safe, rapid, and cost-efficient acquisition of aerial platforms in midair.

SUMMARY

According to one aspect, an aerostat may include an inflatable structure defining a volume; and a payload mechanically coupled to the inflatable structure, the payload including a sensor, an acquisition module, and a controller, the acquisition module operable to generate acquisition energy directable in midair from the payload to an aerial platform flying independently, the controller in electrical communication with the acquisition module and the sensor, the controller configured, based on a signal received from the sensor and associated with flight of inflatable structure, to operate the acquisition module to direct the acquisition energy to the aerial platform such that independent flight of the aerial platform interruptible by the acquisition energy.

In some implementations, the controller may be mechanically coupled to the inflatable structure. For example, the sensor may be a transceiver, and the signal is receivable by the sensor from a source remote from the controller mechanically coupled to the inflatable structure as the inflatable structure moves in midair. Further, or instead, the payload may further include a communication module in electrical communication with the transceiver, and the communication module is in two-way communication with a ground-based guidance system via the transceiver. The communication module may include a radar tracking module, a vision module, or a combination thereof.

In certain implementations, the acquisition module may include a penetration device operable to generate acquisition energy transferrable to the aerial platform in midair. For example, the penetration device may include a source of electromagnetic radiation actuatable by the controller to generate acquisition energy including electromagnetic radiation from the source of electromagnetic radiation. In some instances, the acquisition module may further include a servo-controlled platform, the penetration device is supported on the servo-controlled platform, and configuration of the controller to operate the acquisition module includes configuration of the controller to actuate the servo-controlled platform to change an orientation of the penetration device based on the signal from the sensor. The sensor may include, for example, a targeting camera, and the signal from the sensor includes image information from the targeting camera. In some instances, the source of electromagnetic radiation may include a laser, and the electromagnetic radiation from the source of electromagnetic radiation includes a cutting beam. In some instances, the laser may be operable to generate the cutting beam in pulsed form. Further, or instead, configuration of the controller to operate the penetration device may include configuration of the controller to move the laser with the cutting beam tracking a predetermined shape on the aerial platform flying independently of the inflatable structure. In some instances, the laser may include a mirror and a galvanometer, the galvanometer is in electrical communication with the controller, and configuration of the controller to move the laser with the cutting beam tracking the predetermined shape includes configuration of the controller to move the mirror via actuation of the galvanometer. The laser may have a principal wavelength from 1 microns to 11 microns. For example, the laser may be a diode laser or a carbon dioxide ($CO_2$) laser. As an example, the laser may include a laser tube, the laser tube including an anode terminal and a cathode terminal, and configuration of the of the controller to actuate the penetration device includes configuration of the controller to direct electrical energy to the laser tube via the anode terminal and the cathode terminal of the laser tube The laser tube may have a diameter of 50 mm. Further, or instead, the laser tube may have a length of 450 mm to 600 mm. Additionally, or alternatively, the laser tube may weigh 0.75 kg to 1.5 kg. In certain instances, the laser may be actuatable by input voltage of 10 kV to 20 kV.

In some implementations, the payload 112 may further include a power supply electrically coupled to the sensor, the controller, and the acquisition module. The power supply may include a capacitor bank chargeable prior to lofting the aerostat.

In certain implementations, the acquisition module may include a projectile, and the acquisition energy includes energy launching the projectile to the aerial platform flying independently. The projectile may include a location device (e.g., a homing beacon). In some instances, the aerostat may further include a tether, wherein the projectile is tethered in mechanical communication with the inflatable structure via the tether, and launching the projectile to the aerial platform mechanically couples the inflatable structure to the aerial platform. The tether may be, for example, an out-spooling tether. In certain instances, the projectile may include a head, a tail, and one or more barbs, the one or more barbs disposed on the head and/or on the tail. Further, or instead, the projectile may include a net. Still further, or instead, the projectile may include a parachute. In some instances, the projectile may include a drone launchable from the inflatable structure to the aerial platform flying independently of the inflatable structure. For example, configuration of the controller to operate the acquisition module may include configuration of the controller to control operation of the drone at least after launching of the drone away from the inflatable structure and toward the aerial platform. Further, or instead, configuration of the controller to operate the acquisition module may include configuration of the controller to further control operation of the drone before launching the drone away from the inflatable structure and toward the aerial platform. In some instances, the drone may include at least one propeller, and the drone is guidable toward the aerial platform flying independently of the inflatable structure with the at least one propeller of the drone engageable with the aerial platform. The drone may include a battery and/or a hydrogen-powered fuel cell. Further, or instead, the drone may be a glider. In certain instances, the aerostat may further include comprising a secondary payload supported on the drone, the secondary payload actuatable from the drone to the aerial platform with the secondary payload interrupting independent flight of the aerial platform relative to the drone. The secondary payload may include, for example, one or more secondary projectiles launchable from the drone to the aerial platform. The one or more secondary projectiles may be tethered to the drone and launchable from the drone to establish mechanical communication between the drone and the aerial platform. Further, or instead, the one or more secondary projectiles may include a net. Additionally, or alternatively, the secondary payload may include a laser actuatable to direct a cutting beam from the drone to the aerial platform. For example, the laser may be supported on a wing of the drone. As a more specific example, the laser may be controllable to direct the cutting beam at the aerial platform in front of the drone, higher than the drone, lower than the drone, left of the drone, and/or right of the drone.

According to another aspect, a method of operating an aerostat in acquisition of an aerial platform may include receiving a signal from a sensor mechanically coupled to an inflatable structure, the signal indicative of flight of the inflatable structure lofting an acquisition module, based on the signal from the sensor, determining a position of the acquisition module relative to the aerial platform flying independently of the inflatable structure, and based on the position of the acquisition module relative to the aerial platform, operating the acquisition module to generate acquisition energy directable midair to the aerial platform flying independently of the inflatable structure, the acquisition energy interrupting independent flight of the aerial platform.

In some implementations, the method may further include, based on the signal from the sensor, selectively actuating a valve in fluid communication with a volume defined by the inflatable structure, wherein selectively actuating the valve controls net buoyancy of the inflatable structure and mass mechanically coupled to the inflatable structure. For example, the valve in fluid communication with the volume of the inflatable structure may be selectively controlled such that, with the inflatable structure mechanically coupled to the aerial platform, the net buoyancy of the inflatable structure and mass mechanically coupled to the inflatable structure is negative.

According to yet another aspect, a system for rapid aerostat deployment in aerial platform acquisition may include an inflatable structure defining a volume, a payload mechanically coupled to the inflatable structure, the payload including an acquisition module operable to generate acquisition energy directable to an aerial platform in midair to interrupt independent flight of the aerial platform relative to the inflatable structure, a reactor defining a chamber, a valve in fluid communication between the chamber and the volume, the chamber and the volume selectively connectable in fluid communication via actuation of the valve, a storage container, and activated aluminum in the storage container, the activated aluminum releasable from the storage container into chamber of the reactor, the activated aluminum reactive with water in the chamber to produce hydrogen containing gas movable into the volume of the inflatable structure with the chamber in fluid communication with the volume via the valve.

In certain implementations, the inflatable structure, the valve, and the payload may be releasable from the reactor with hydrogen-containing gas in the volume of the inflatable structure.

BRIEF DESCRIPTION OF THE DRAWINGS

FIG. 1B is a schematic representation of the aerostat of FIG. 1A deployed in midair and approaching an aerial platform to be acquired.

DETAILED DESCRIPTION

Figure 1A:
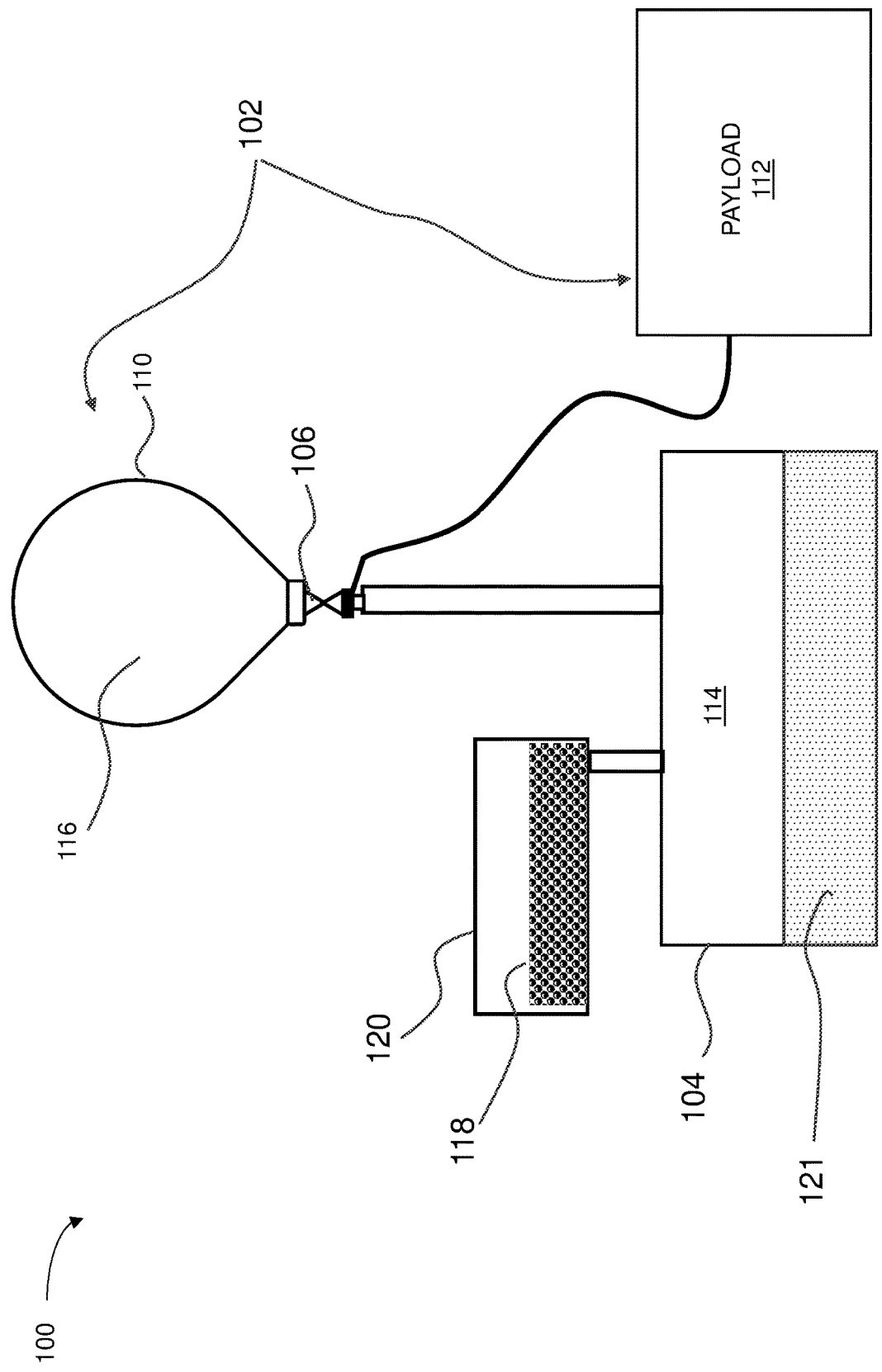
FIG. 1A is a schematic representation of a system for rapid aerostat deployment in aerial platform acquisition, the system including an aerostat and a reactor, shown with the aerostat coupled to the reactor prior to deployment of the aerostat.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to explain the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

As used herein, the term "aerostat" shall be understood to include any one or more of various, different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various, different manned or unmanned craft, dirigible or non-dirigible craft, independently propelled or floating craft, rigid or nonrigid craft, tethered or untethered craft, or combinations thereof. Further, it shall be understood that an aerostat includes at least a balloon and may additionally include other elements, such as a payload and/or equipment for tethering to a payload. While this convention is used in the description that follows, it should generally be appreciated that the balloon relates to other elements of launching systems in the same way that the aerostat relates to such launching systems. Thus, for the sake of reducing unnecessary repetition, launching the balloon and/or detaching the balloon as described herein may be used interchangeably with launching the corresponding aerostat and/or detaching the corresponding aerostat unless otherwise specified or made clear from the context.

As used herein, the term "acquisition" and variants thereof shall be understood to include any manner and form of engagement of midair interaction between an aerostat and an aerial platform that includes rendering a target aerial platform ineffective and, further or instead, may include bringing the target aerial platform to the ground (e.g., for collection and/or analysis). In certain instances, acquisition may include interruption of independent flight of aerial platform relative to the aerostat and/or includes tracking the aerial platform. For example, acquisition of an aerial platform may include creating a hole in the aerial platform, ensnaring the aerial platform to fly with the aerostat and/or with a drone deployed from the aerostat, adding mass to the aerial platform to drag the aerial platform toward the ground, etc. As a specific example, in instances in which the aerial platform includes a soft portion (e.g., a balloon), acquisition of the aerial platform may include piercing the soft portion of the aerial platform to pop or vent the aerial platform (e.g., via an igniter or controlled vent of lifting gas to from a balloon of the aerial platform. Further, or instead, acquisition of an aerial platform may include positioning a locating device (e.g., a homing beacon) on the aerial platform for tracking the aerial platform such that, for example, the aerial platform may be taken down at a later time.

As used herein, unless otherwise specified or made clear from the context, the term "aerial platform" shall be understood to include any one or more of various different types of objects movable through air with or without an independent propulsion source and that is an intended target for acquisition by any one or more of the aerostats described herein. Thus, for example, an aerial platform may itself be an aerostat. Additionally, or alternatively, an aerial platform may be floating detritus that may pose a risk to people and/or property. In view of the foregoing, it shall be appreciated that the aerial platform may have any one or more of various different intents or an unknown intent or no intent. For example, an aerial platform targeted for acquisition according to the systems, aerostats, and methods described herein may be adversarial in some instances (e.g., a reconnaissance balloon or other craft belonging to an enemy and/or a competitor). Further, or instead, an aerial platform targeted for acquisition according to the systems, aerostats, and methods described herein may be friendly in some instances (e.g., a weather balloon or other craft with known benign intent, but nevertheless requires acquisition).

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, an inflatable structure 110 of an aerostat 102, an inflatable structure 310 of aerostat 302, an inflatable structure 410 of an aerostat 402, and an inflatable structure 510 of an aerostat 502 shall be understood to be analogous to or interchangeable with one another, unless otherwise specified or made clear from the context.

Figure 1C:
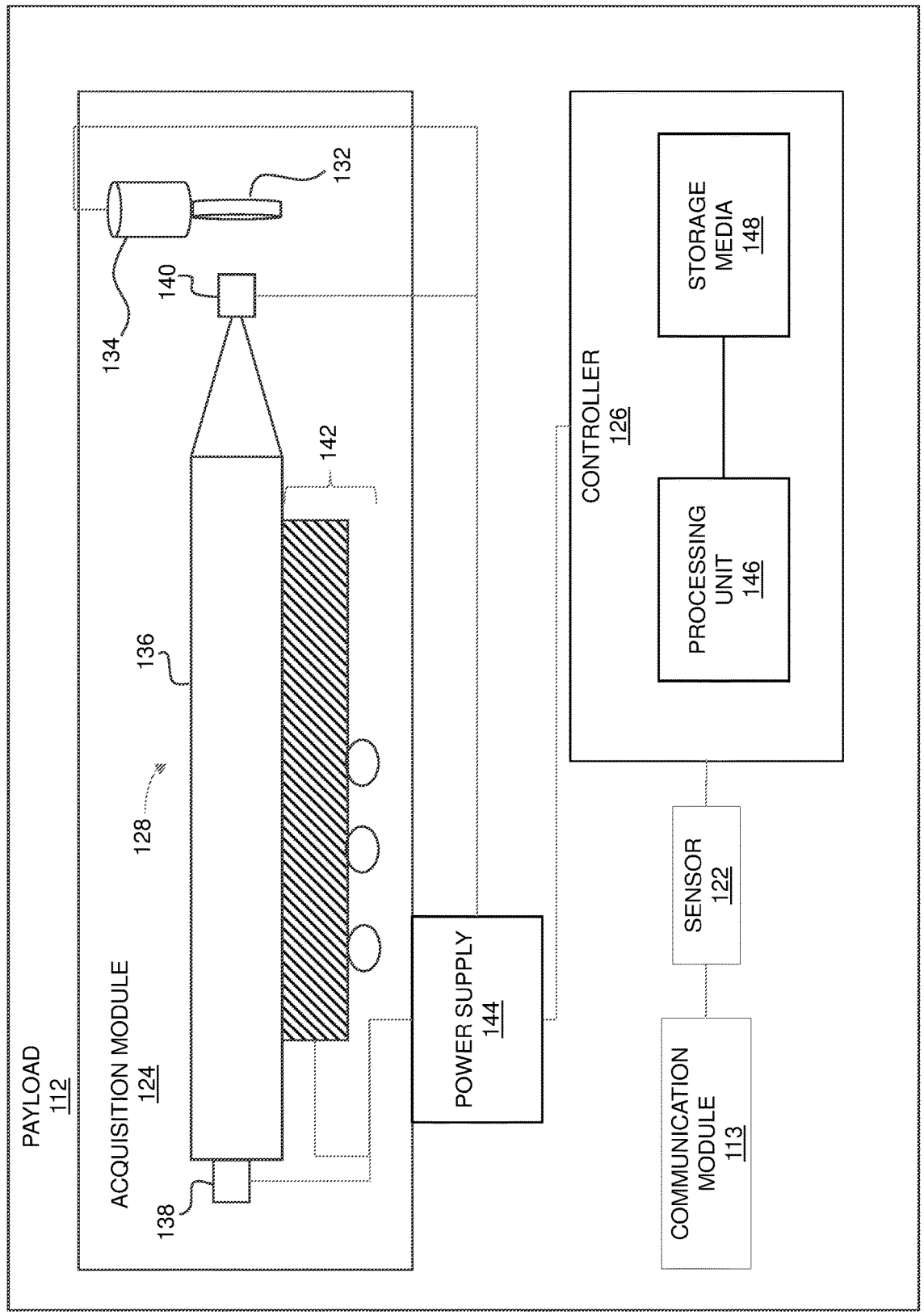
FIG. 1C is a schematic representation of a payload of the aerostat of FIG. 1A.

Referring now to FIGS. 1A-1C, a system 100 be used for mid-air acquisition of an aerial platform 101. The aerial platform 101 may include a balloon 129 and a target payload 111. The system 100 may facilitate rapid and cost-effective acquisition of the aerial platform 101. Further, or instead, the system 100 may facilitate acquiring the aerial platform with little or no damage to the target payload 111, as may be useful for preserving the target payload 111 for analysis by technical experts on the ground.

The system 100 may include an aerostat 102, a reactor 104, and a storage container 120. As described in greater detail below, the aerostat 102 may include an inflatable structure 110 and a payload 112, with the payload 112 mechanically coupled to the inflatable structure 110. The reactor 104 may define a chamber 114, the inflatable structure 110 may define a volume 116. In some instances, the aerostat 102 may further, or instead, include a valve 106 in fluid communication between the chamber 114 of the reactor 104 and the volume 116 of the inflatable structure 110, and the valve 106 may be actuatable to selectively connect the chamber 114 of the reactor 104 and the volume 116 of the inflatable structure 110 in fluid communication with one another. As described in greater detail below, compared to the use of a missile and/or a jet to intercept an aerial platform, the system 100 may rapidly and reliably deploy the aerostat 102 to intercept the aerial platform 101, even in remote locations and under a variety of conditions. Further, or instead, as compared to the use of a missile and/or a jet, to intercept an aerial platform, the system 100 may be inexpensive and amenable to long-term storage with little or no periodic maintenance such that the system 100 may be prophylactically positioned in any one or more of a variety of strategic locations for long periods of time, until the system 100 is required to operate for rapid deployment of the aerostat 102. In some instances, the system 100 may be sized relative to the size of the aerial platform 101 to be acquired. Further, or instead, to facilitate storing the system 100 for long periods, the system 100 may be made from materials and equipment that withstand storage for up to several years. Still further, or instead, long-term storage (e.g., in an unattended and/or uncontrolled environment) may be facilitated through the use of few electronics that may be rapidly powered (e.g., through use of batteries and/or capacitors) to launch the aerostat 102 to intercept the aerial platform 101. In some instances, the system 100 may be storable in a compact container requiring only replacement of a power source (e.g., a battery) if a predetermined time in storage has passed.

In use, as also described in greater detail below, the system 100 may be operable to fill the volume 116 of the inflatable structure 110 with lifting gas providing net positive buoyancy to at least the inflatable structure 110 and the payload 112 and, under lifting force provided by the lifting gas, the inflatable structure 110 and the payload 112 may be lofted to carry out any one or more of the various different techniques for acquiring the aerial platform 101 in midair. The inflatable structure 110 may be an inflatable structure described in U.S. Pat. No. 11,130,557 B1, entitled "CONTROLLING LIFTING GAS IN INFLATABLE STRUCTURES," the entire contents of which are incorporate herein by reference. In certain implementations, the system 100 may include activated aluminum 118 in a storage container 120 (e.g., where the activated aluminum 118 may be stored long-term with little or no degradation by moisture) with the activated aluminum 118 releasable from the storage container 120 (e.g., manually) into the chamber 114 of the reactor 104, where the activated aluminum 118 may react with water 121 in the chamber 114 for the rapid and robust production of hydrogen-containing gas as a lifting gas for lofting the aerostat 102. The activated aluminum 118 may include activated aluminum described in U.S. Pat. No. 10,745,789, entitled "ACTIVATED ALUMINUM FUEL" and/or in U.S. Pat. No. 11,332,366, entitled "CONTROLLING REACTABILITY OF WATER-REACTIVE ALUMINUM," with the entire contents of each of these incorporated herein by reference. The valve 106 may be actuated (e.g., manually and/or via an actuator) to an open position such that the lifting gas in the chamber 114 of the reactor 104 may move into the volume 116 of the inflatable structure 110. With the lifting gas in the volume 116 of the inflatable structure 110 and providing net positive buoyancy to the aerostat 102, the valve 106 may be actuated to a closed position to maintain the lifting gas within the volume 116 of the inflatable structure 110. Given the rapid generation of the hydrogen-containing gas through the reaction of the activated aluminum 118 with the water 121 in the chamber 114 of the reactor 104, the system 100 may be used to loft the aerostat 102 rapidly (e.g., in less than 20 minutes). Further, or instead, the aerostat 102 may be released from the reactor 104 such that the aerostat 102 may float into the air into the vicinity of the aerial platform 101, where the payload 112 of the aerostat 102 may carry out any one or more of various, different operations described herein for acquiring the aerial platform 101.

In general, the payload 112 of the aerostat 102 may include a sensor 122, an acquisition module 124, and a controller 126. The controller 126 may be in electrical communication with the sensor 122 and the acquisition module 124. The acquisition module 124 may be operable to generate acquisition energy directable in midair from the payload 112 to the aerial platform 101 flying independently of the aerostat 102. As described in greater detail below, the controller 126 may receive a signal from the sensor 122 and may operate the acquisition module 124 to direct the acquisition energy from the acquisition module 124 to the aerial platform 101 such that the acquisition energy may interrupt independent flight of the aerial platform 101, resulting in acquisition of the aerial platform 101.

In certain implementations, the acquisition module 124 may include a penetration device 128 operable to generate acquisition energy transferrable to the aerial platform 101 in midair. In particular, the acquisition energy generated by the penetration device 128 may include any one or more forms of energy that may be efficiently generated onboard the aerostat 102 in midair and is transferrable from the aerostat 102 to the aerial platform 101 in midair to penetrate material of the aerial platform 101. For example, in instances in which the aerial platform 101 includes a balloon 129, the acquisition energy generatable by the penetration device 128 and delivered from the aerostat 102 to the aerial platform 101 may penetrate material of the balloon 129 such that lifting gas in the balloon 129 may be released to the atmosphere and the aerial platform 101 may fall toward the ground.

In some instances, the penetration device 128 may include a source of electromagnetic radiation actuatable by the controller 126 to generate acquisition energy including electromagnetic radiation from the source of electromagnetic radiation. The electromagnetic radiation may have any one or more of various different wavelengths useful for intercepting the aerial platform 101 in midair. The electromagnetic radiation may include, by way of example, radio waves, microwaves, infrared radiation, visible light, and/or ultraviolet radiation. For example, the penetration device 128 may be a laser, and the electromagnetic radiation may include a cutting beam (e.g., in pulsed form) directable from the penetration device 128 on the aerostat 102 to the aerial platform 101 in midair. The penetration device 128 may include a mirror 132 and a galvanometer 134, with the controller 126 in electrical communication with the galvanometer 134. The controller 126 may actuate the galvanometer 134 to move the mirror 132 such that position of the cutting beam of the penetration device 128 may be finely controlled. As an example, the controller 126 may actuate the galvanometer 134 to move the mirror 132 such that the penetration device 128 may be steered at high speed trace a predetermined shape (e.g., a circle) on the aerial platform 101 flying independently of the aerostat 102, with the predetermined shape facilitating significant and rapid gas loss even in instances in which the balloon 129 of the aerial platform 101 has a large volume. Further, or instead, the penetration device 128 may be a laser having a principal wavelength from 1 micron to 11 microns, which is a range useful for forming cutting beams that can pierce material (e.g., polyethylene) that is typically used for stratospheric balloons such as the balloon 129 of the aerial platform 101. Thus, for example, the penetration device 128 may be a diode laser ((Nd:YAG or infrared) or a carbon dioxide ($CO_2$) laser.

Continuing with this example of the penetration device 128 being a laser, the penetration device 128 may include a laser tube 136 including an anode terminal 138 and a cathode terminal 140. The controller 126 may actuate the laser by selectively directing electrical energy to the laser tube 136 via the anode terminal 138 and the cathode terminal 140. The laser tube 136 may be sized according to the competing considerations of having enough power to interrupt independent flight of the aerial platform 101 while being operable by power that can be carried as part of the payload 112 of the aerostat 102. Thus, for example, the laser tube 136 may have a diameter of 50 mm. Additionally, or alternatively, the laser tube 136 may have a length of 450 mm to 600 mm. Further, or instead, the laser tube may weigh 0.75 kg to 1.5 kg. In certain instances, the laser 130 may be actuatable by input voltage of 10 kV to 20 kV (e.g., 12 kV) such that only a few milliamps of current may be required to power the laser 130.

Further, or instead, the acquisition module 124 may include a servo-controlled platform 142. The penetration device 128 may be mounted on the servo-controlled platform 142, and the controller 126 may actuate the servo-controlled platform 142 to change an orientation of the penetration device 128 based on a signal from the sensor 122 of the payload 112. The change in orientation of the penetration device 128 may, for example, include coarse adjustment to relative orientation of the penetration device 128 relative to the aerial platform 101.

In some implementations, the payload 112 may include a power supply 144 electrically coupled to the sensor 122, the acquisition module 124, and the controller 126. For example, the power supply 144 may be a capacitor bank (e.g., high-energy, high-density capacitors) such that voltage, power, and total energy required for the penetration device 128 may be provided by charging the power supply 144 before launching the aerostat 102 (e.g., while the aerostat 102 is on the ground). As compared to Li ion batteries, the capacitor bank may be implemented using a lighter circuit, given that the capacitors may have high-voltage output and, therefore, may not require circuitry associated with stepping up voltage. Additionally, or alternatively, the power supply 144 may include a fuel cell operable to generate electricity to charge capacitors and/or batteries for powering the payload 112 carried aloft by the inflatable structure 110 of the aerostat 102.

In general, the sensor 122 may be any one or more of various, different types of sensors associated with directly or indirectly determining one or more aspects of flight of the aerostat 102. As an example, the sensor 122 may include a targeting camera, and the signal from the sensor 122 to the controller 126 may include image information from the sensor 122. For example, returning to the example in which the penetration device 128 is a laser, the servo-controlled platform 142 may be controlled, based on the image information from the sensor 122, to project the cutting beam of the laser onto the aerial platform 101. Further, or instead, the sensor 122 may include an altimeter for detecting height of the aerostat 102 during flight.

While the sensor 122 may determine one or more aspects of flight of the aerostat 102 via detection of one or more parameters onboard the aerostat 102 in midair flight, the sensor 122 may additionally or alternatively determine one or more aspects of flight of the aerostat 102 according to one or more signals originating away from the aerostat 102. For example, the sensor 122 may be a transceiver in some instances, and the signal directed from the sensor 122 to the controller 126 is from a source remote from the controller 126 mechanically coupled to the inflatable structure 110 as the aerostat 102 moves in midair (e.g., from a source on the ground). Continuing with this example, the payload 112 may include a communication module 113 in electrical communication with the sensor 122, and the communication module 113 may be in two-way communication with a ground-based guidance system via the sensor 122. The communication module 113 may include, for example, a radar tracking module, a vision module, or a combination thereof.

In general, the controller 126 may be mechanically coupled to the payload 112 and, further or instead, may include a processing unit 146 and non-transitory computer-readable storage media 148, with the non-transitory computer readable storage media 148 having stored thereon instructions for causing the processing unit 146 to carry out one or more aspects of operation of the aerostat 102 in acquisition of the aerial platform 101. For example, the non-transitory computer-readable storage media 148 may have stored thereon instructions for causing the processing unit to receive a signal from the sensor 122, the signal associated with flight of the inflatable structure 110 (e.g., a signal indicative of position of the aerostat 102 relative to the aerial platform 101) and, based on the signal received from the sensor 122, to operate the acquisition module 124 to direct the acquisition energy to the aerial platform 101 such that independent flight of the aerial platform 101 interruptible by the acquisition energy.

In some implementations, the controller 126 may be additionally, or alternatively, in fluid communication with the valve 106, and the non-transitory computer-readable storage media 148 may have stored thereon instructions for actuating the valve 106 between an open position and a closed position to control net buoyancy of the inflatable structure 110 and mass mechanically coupled to the inflatable structure 110. For example, actuation of the valve 106 by the controller 126 may release condensed moisture from the hydrogen-containing base in the volume 116 to be released such that net buoyancy of the aerostat 102 increases to move the aerostat 102 toward the aerial platform 101. As another example, actuation of the valve 106 by the controller 126 may release some of the hydrogen-containing gas from the volume 116 of the inflatable structure 110 such that net buoyancy of the aerostat 102 decreases to move the aerostat 102 toward the aerial platform 101.

Figure 2:
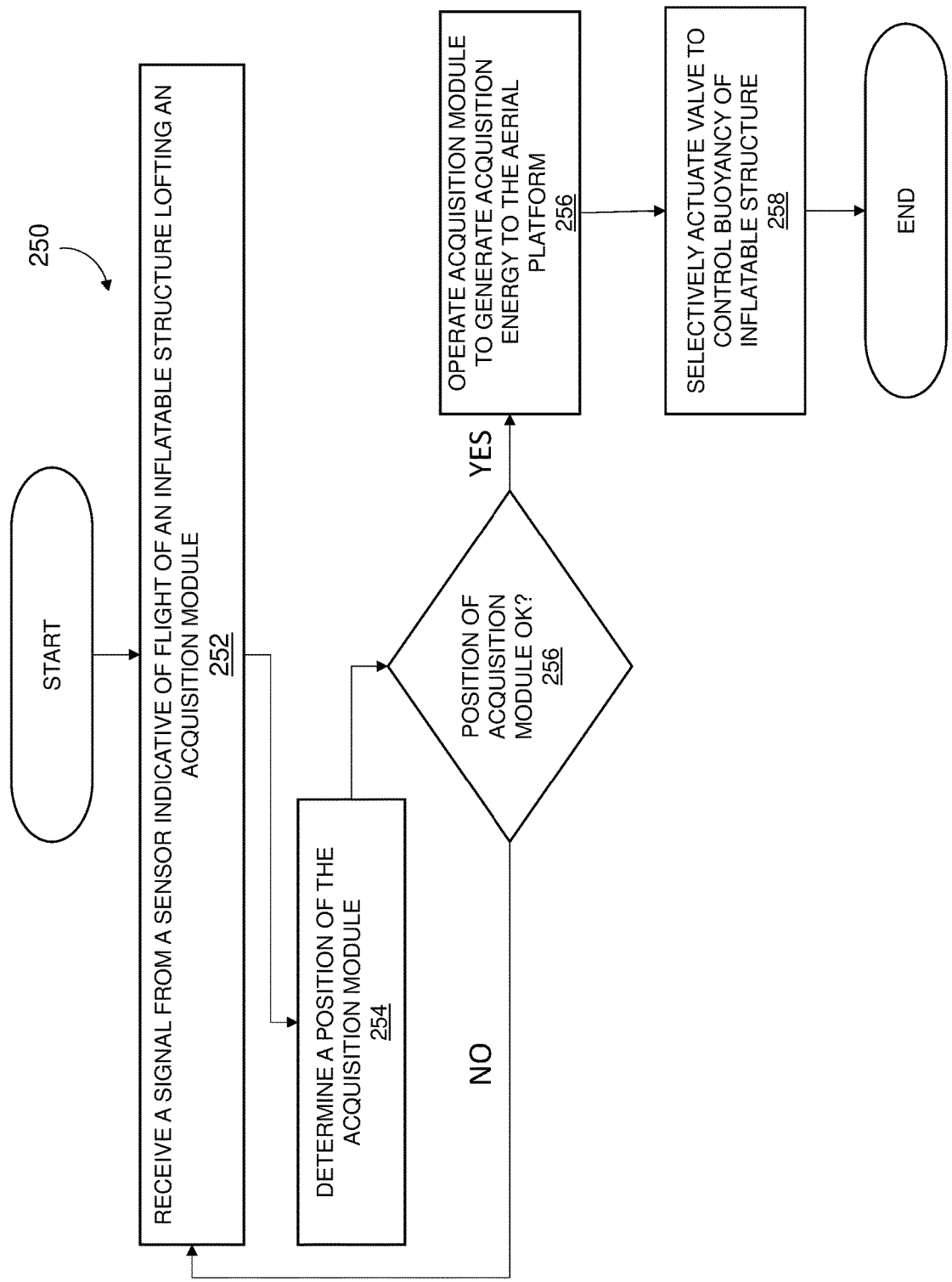
FIG. 2 is a flowchart of an exemplary method of operating an aerostat in acquisition of an aerial platform.

FIG. 2 is a flowchart of an exemplary method 250 of operating an aerostat in acquisition of an aerial platform. Unless otherwise specified or made clear from the context, it shall be understood that any one or more of various different aspects of the exemplary method 250 may be carried out by the controller 126 (FIG. 1C) in electrical communication with one or more instances of the sensor 122 (FIG. 1A) and the acquisition module 124 (FIG. 1A). For example, the non-transitory computer-readable storage media 148 (FIG. 1C) may have stored thereon instructions for causing the processing unit 146 (FIG. 1C) to carry out one or more aspects of the exemplary method 250.

As shown in step 252, the exemplary method 250 may include receiving a signal from a sensor mechanically coupled to an inflatable structure of an aerostat. The signal may be indicative of flight of the inflatable structure lofting an acquisition module of the aerostat.

As shown in step 254, the exemplary method 250 may include, based on the signal from the sensor, determining a position of the acquisition module relative to the aerial platform flying independently of the inflatable structure.

As shown in step 256, the exemplary method 250 may include, based on the position of the acquisition module relative to the aerial platform, operating the acquisition module to generate acquisition energy directable midair to the aerial platform flying independently of the inflatable structure. The acquisition energy delivered to the aerial platform may interrupt independent flight of the aerial platform.

As shown in step 258, the exemplary method 250 may additionally, or alternatively, include, based on the signal from the sensor, selectively actuating a valve in fluid communication with the volume defined by the inflatable structure. Selectively actuating the valve may control net buoyancy of the inflatable structure and mass mechanically coupled to the inflatable structure. As an example, the valve in fluid communication with the volume of the inflatable structure may be selectively controlled such that, with the inflatable structure mechanically coupled to the aerial platform (e.g., by a wire) being acquired, the net buoyancy of the inflatable structure and mass mechanically coupled to the inflatable structure is negative, thus moving the acquired aerial platform toward the ground.

Having described the use penetration devices including electromagnetic radiation, attention is now directed to description of other types penetration devices actuatable to direct other types of energy to the aerial platform to carry out acquisition of the aerial platform.

Figure 3:
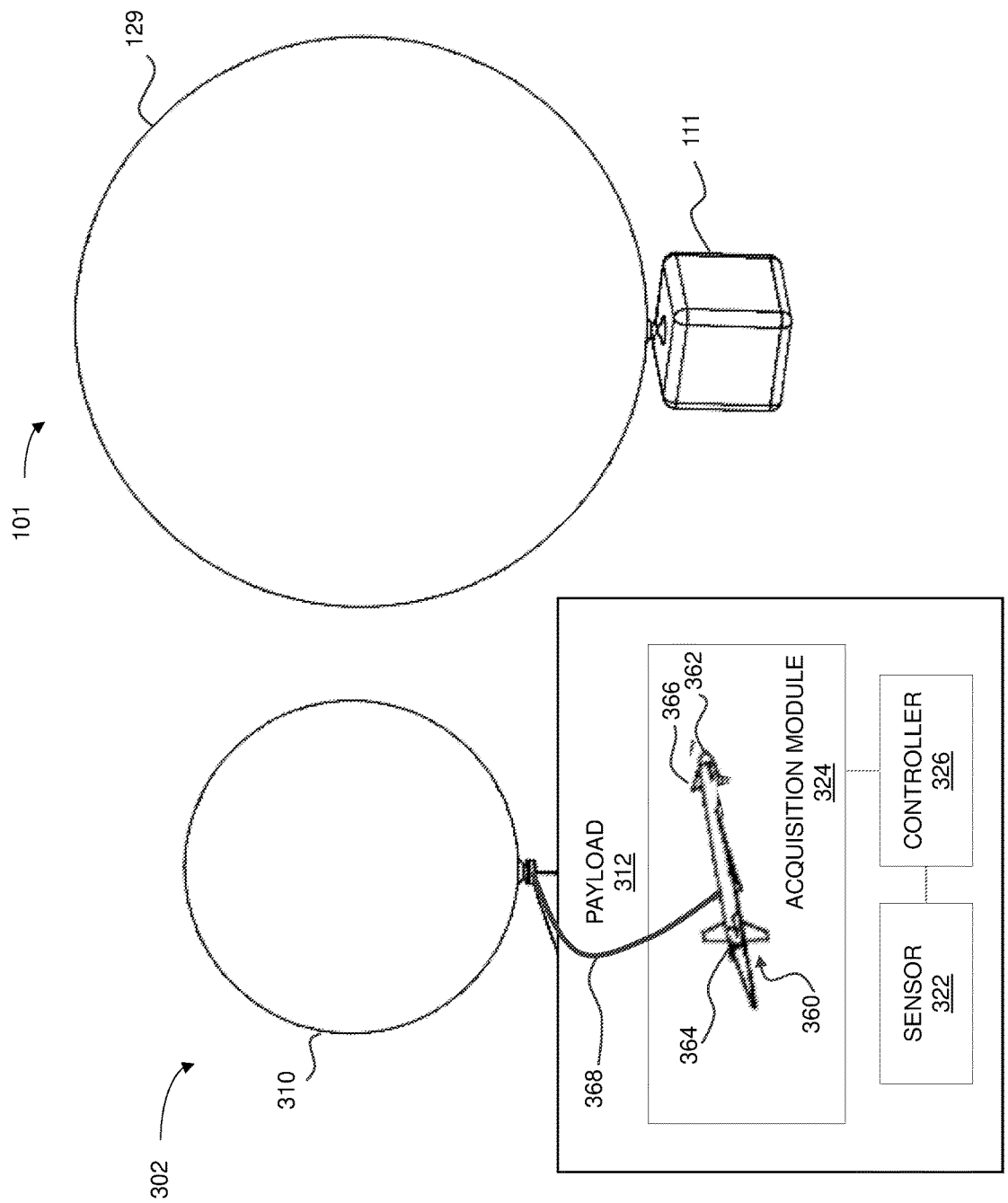
FIG. 3 is a schematic representation of an aerostat for acquisition of an aerial platform deployed in midair and approaching an aerial platform to be acquired, the aerostat including an inflatable structure and a projectile directable from the inflatable structure to the aerial platform.

Referring now to FIG. 3, an aerostat 302 may include an inflatable structure 310 and a payload 312 with the payload 312 mechanically coupled to the inflatable structure 310. The payload 312 may include a sensor 322, an acquisition module 324, and a controller 326. The controller 326 may be in electrical communication with the sensor 322 and the acquisition module 324. The acquisition module 324 may include a projectile 360. The controller 326 may control the acquisition module 324, based on a signal from the sensor 322 and indicative of flight of the inflatable structure 310, to generate acquisition energy that launches the projectile 360 to the aerial platform 101 flying independently of the aerostat 302.

In some instances, the projectile 360 may include a location device (e.g., a homing beacon) that may facilitate accurate, real-time tracking of the aerial platform 101. Such location tracking may facilitate recovering the aerial platform 101 following interruption of independent flight of the aerial platform 101. Further, or instead, location tracking using the projectile 360 may be useful for coordinating interruption of independent flight of the aerial platform 101 relative to factors on the ground (e.g., terrain, proximity to population, proximity to property, etc.).

The projectile 360 may additionally, or alternatively, ensnare, entangle, and/or perforate the aerial platform 101 to interrupt independent flight of the aerial platform 101. As an example, the projectile 360 may include a head 362, a tail 364, and one or more barbs 366 disposed on the head 362 and/or on the tail 364. The one or more barbs 366 may impale and/or ensnare the aerial platform 101, such as by piercing or entangling a soft membrane of the aerial platform 101 and/or attachment cords of the aerial platform 101. As an example, at least one of the one or more barbs 366 may be forward-facing in a direction in which the projectile is launched from the aerostat 302 to the aerial platform 101 flying independently of the aerostat 302. The at least one of the one or more barbs 366 may, in some instances, reduce the likelihood that the projectile 360 may pass through the aerial platform 101. While the projectile 360 may be solid between the head 362 and the tail 364, it shall be appreciated that the head 362 and the tail 364 may be mechanically coupled to one another via a cord that may be coiled prior to launching the projectile 360 and straightens during flight of the projectile 360 toward the aerial platform 101. Continuing with this example, once the head 362 pierces the aerial platform 101, a decrease in velocity of the head 362 may cause the cord to coil such that the tail 364 is on one side of the aerial platform 101 and the head 362 is on another side of the aerial platform 101 with the cord entrapping the aerial platform 101, thus increasing the likelihood of interrupting independent flight of the aerial platform 101 such that the aerial platform 101 falls toward the earth. Additionally, or alternatively, the projectile 360 may include a net that ensnares the aerial platform 101. Further, or instead, the projectile 360 may include a parachute that may facilitate controlled descent of the aerial platform 101 that has been acquired by the aerostat 302.

In certain implementations, the aerostat 302 may further include a tether 368 (e.g., an out-spooling tether) coupling the projectile 360 in mechanical communication with the inflatable structure 310. That is, with the projectile 360 engaged with (e.g., ensnaring and/or entangled with) the aerial platform 101, the tether 368 may mechanically couple the inflatable structure 310 of the aerostat 302 with the aerial platform 101 being acquired. With such mechanical communication, the buoyancy of the inflatable structure 310 may be controlled to achieve net negative buoyancy of the collective mass of the aerostat 302 tethered to the aerial platform 101 such that the aerostat 302 and the aerial platform 101 may descend together toward the ground.

Having described projectiles as being propelled from an aerostat to engage an aerial platform, attention is now directed to projectiles that may include drones-heavier-than-air unmanned aircraft that derive its lift principally from aerodynamic forces. Among other things, the use of a drone as a projectile may be useful for maneuvering relative to the aerial platform for effective ensnaring and/or entanglement of the aerial platform. Further, because the aerostat lifts the drone, the size of the drone that may be used to acquire the aerial platform may be small and thus, easily transportable/storable and cost-effective. For example, the inflatable structure may loft the drone toward the altitude of the target aerial platform (which may be 80,000 feet). At or near the altitude of the target aerial platform, the drone may be release from the inflatable structure to acquire the target aerial platform. Thus, the drone may execute a short flight to acquire the target aerial platform, making the battery requirements for the drone modest. Further, or instead, the inflatable structure may loft the drone higher than the target aerial platform such that, once released from the inflatable structure, the drone may glide toward the target aerial platform as may be useful for reducing battery requirements of the drone.

Figure 4A:
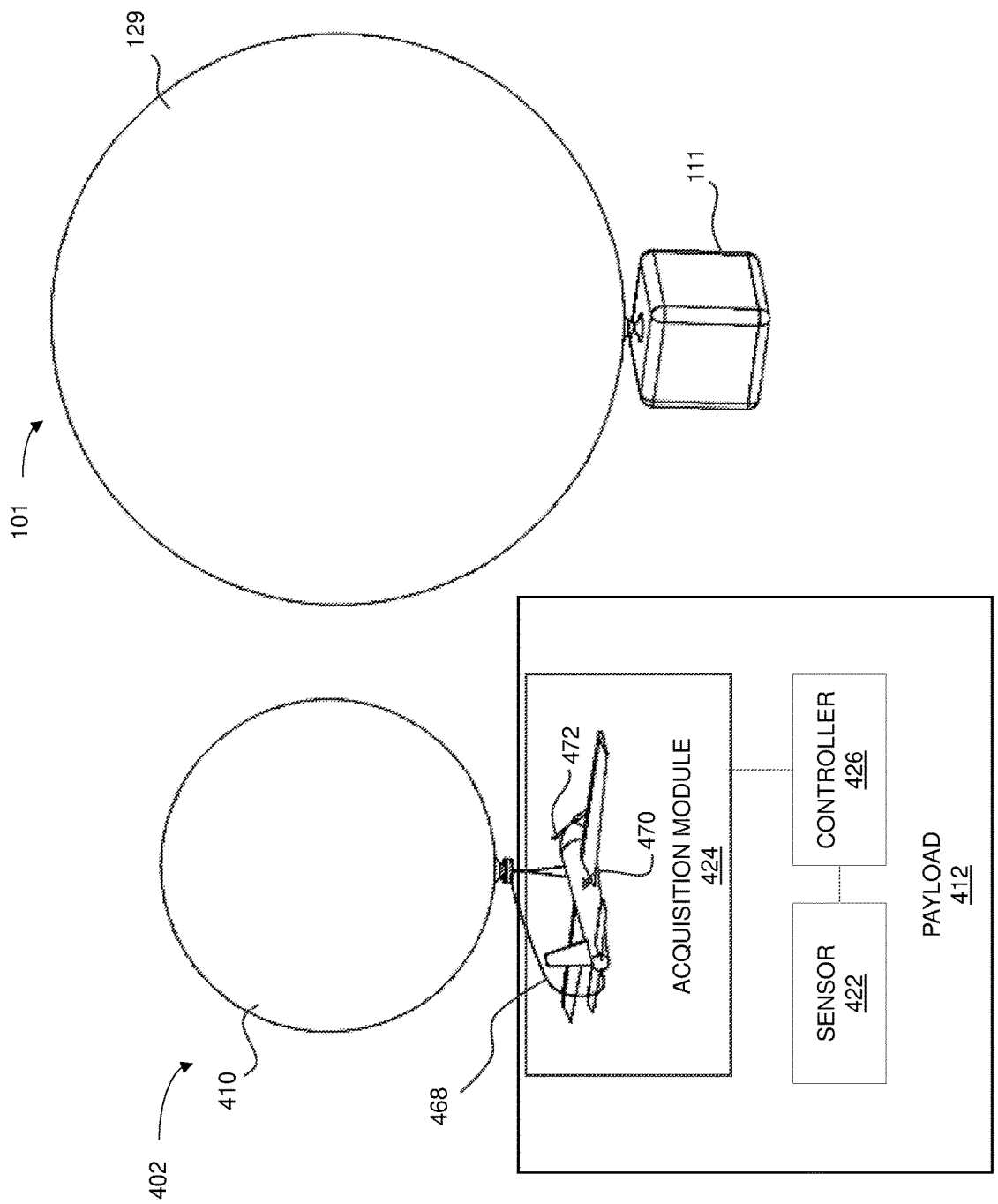
FIG. 4A is a schematic representation of an aerostat for acquisition of an aerial platform deployed in midair and approaching an aerial platform to be acquired, the aerostat including an inflatable structure and a drone launchable from the inflatable structure toward the aerial platform, the aerostat shown in a first timestep t=t1, where t1=0.
Figure 4B:
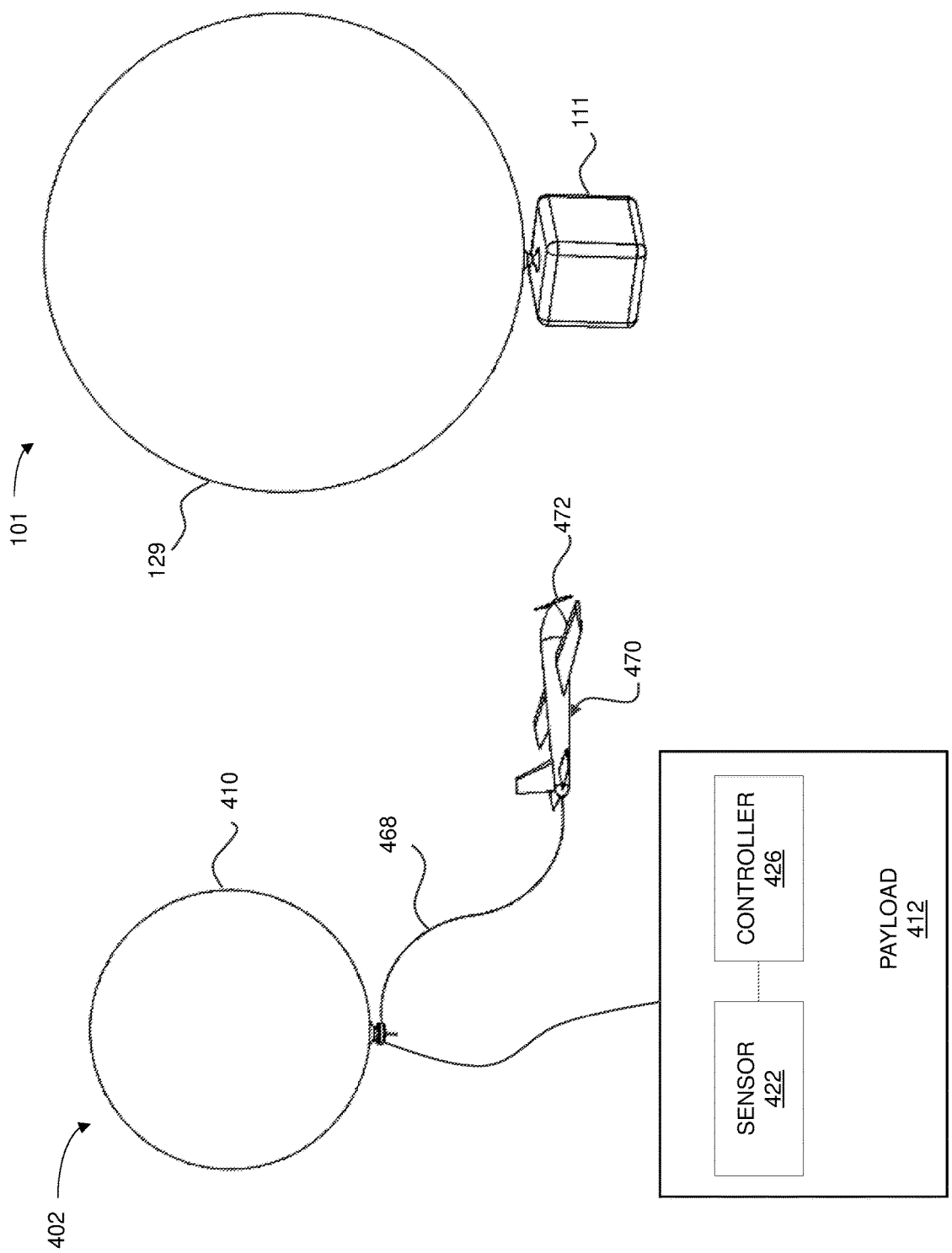
FIG. 4B is a schematic representation of the aerostat of FIG. 4A, the aerostat shown in a second timestep t=t2, where t2>t1, with the drone detached from the inflatable structure and moving toward the aerial platform in midair.
Figure 4C:
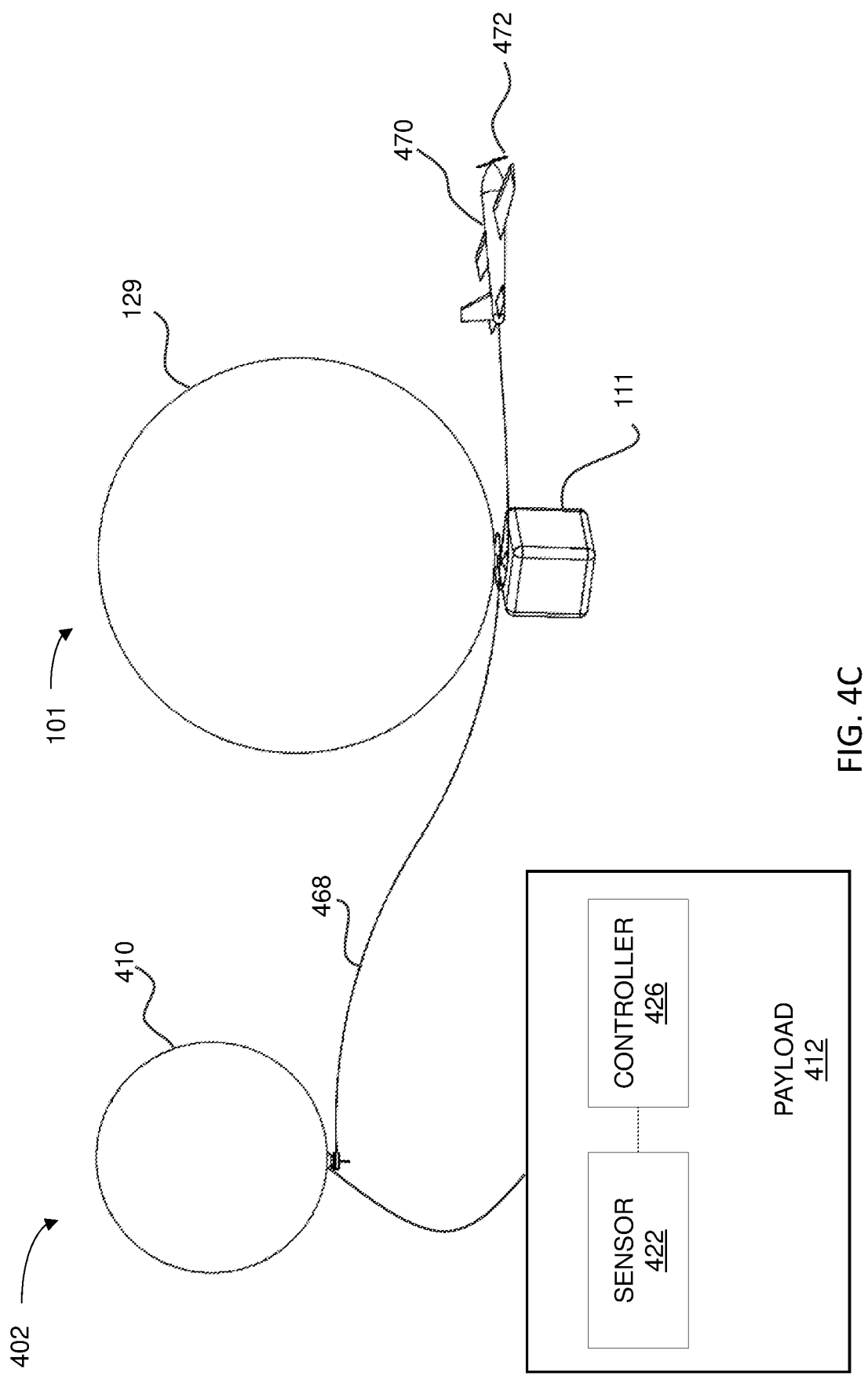
FIG. 4C is a schematic representation of the aerostat of FIG. 4A, the aerostat shown in a third timestep t=t3, where t3>t2, with the drone detached from the inflatable structure and a tether between the drone and the inflatable structure entangling the aerial platform in midair.

Referring now to FIGS. 4A-4C, an aerostat 402 may include an inflatable structure 410 and a payload 412 with the payload 412 mechanically coupled to the inflatable structure 410. The payload 412 may include a sensor 422, an acquisition module 424, and a controller 426. The controller 426 may be in electrical communication with the sensor 422 and the acquisition module 424. The acquisition module 424 may include a projectile, such as a drone 470 (e.g., a fixed wing drone).

The controller 426 may control the acquisition module 424, based on a signal from the sensor 422 and indicative of flight of the inflatable structure 410, to generate acquisition energy that launches the drone 470 to the aerial platform 101 flying independently of the aerostat 402. Further, or instead, the controller 426 may control operation of the drone 470 at least after launching the drone 470 away from the inflatable structure 410 and toward the aerial platform 101. For example, the controller 426 may control flight of the drone 470 relative to the aerial platform 101 to facilitate ensnaring the aerial platform 101 with the drone 470. Further, or instead, the controller 426 may control operation of the drone 470 before launching the drone 470 away from the inflatable structure 410 and toward the aerial platform 101. For example, the controller 426 may power up the drone 470 in preparation for launching the drone when the aerostat 402 is within a predetermined distance of the aerial platform 101. Further, or instead, the drone 470 may include one or more propellers 472 and, prior to launching the drone 470, the controller 426 may power up the drone 470 such that the one or more propellers 472 may be used to steer the aerostat 402 toward the aerial platform 101 prior to launching the drone 470. Additionally, or alternatively, the drone 470 may be guidable (e.g., by the controller 426) toward the aerial platform 101 flying such that the one or more propellers 472 of the drone 470 engage with the aerial platform 101 to ensnare and/or entangle at least a portion of the aerial platform in the one or more propellers 472. In some implementations, the drone 470 may include a battery that powers the drone 470 in flight toward the aerial platform 101. In certain implementations, the drone 470 may include a hydrogen-powered fuel cell that may be powered by at least some of the hydrogen-containing gas (e.g., generated from activated aluminum, as described herein) acting as a lifting gas in the inflatable structure 410 of the aerostat 402. Further, or instead, the drone 470 may be a glider releasable by the aerostat 402 above the aerial platform 101.

In certain implementations, the aerostat 402 may include a tether 468 (e.g., a fishing line, a line made of a heat-resistant, synthetic, lightweight fiber sold under the trademark Kevlar®, or a combination thereof) mechanically coupling the inflatable structure 410 to the drone 470 as the drone 470 moves relative to the aerial platform 101. As the drone 470 moves relative to the inflatable structure 410 and the aerial platform 101 (e.g., by flying around the aerial platform 101), the tether 468 may facilitate ensnaring and/or entangling the aerial platform 101. With the aerial platform 101 ensnared and/or entangled with the drone 470, the tether 468, or both, it shall be appreciated that the collective mass of the entanglement may be directed toward the ground, where the aerial platform 101 and analyzed. For example, the collective mass may be directed to the ground by flying the drone 470 downward to drag the aerial platform 101 to the ground. Further, or instead, as the collective mass including the inflatable structure 410 and the aerial platform 101 moves toward the ground, the inflatable structure 410 may vent or pop itself such that the drone 470 does not have to work against buoyancy of the inflatable structure 410 as the drone 470 flies toward the ground.

Having described drones as flying into aerial platforms and/or entangling aerial platforms via a tether, attention is now directed to implementations in which drones include secondary payloads, movable with the drone and deployable from the drone to facilitate accurate and effective engagement with the aerial platform to interrupt independent flight of the aerial platform.

Figure 5:
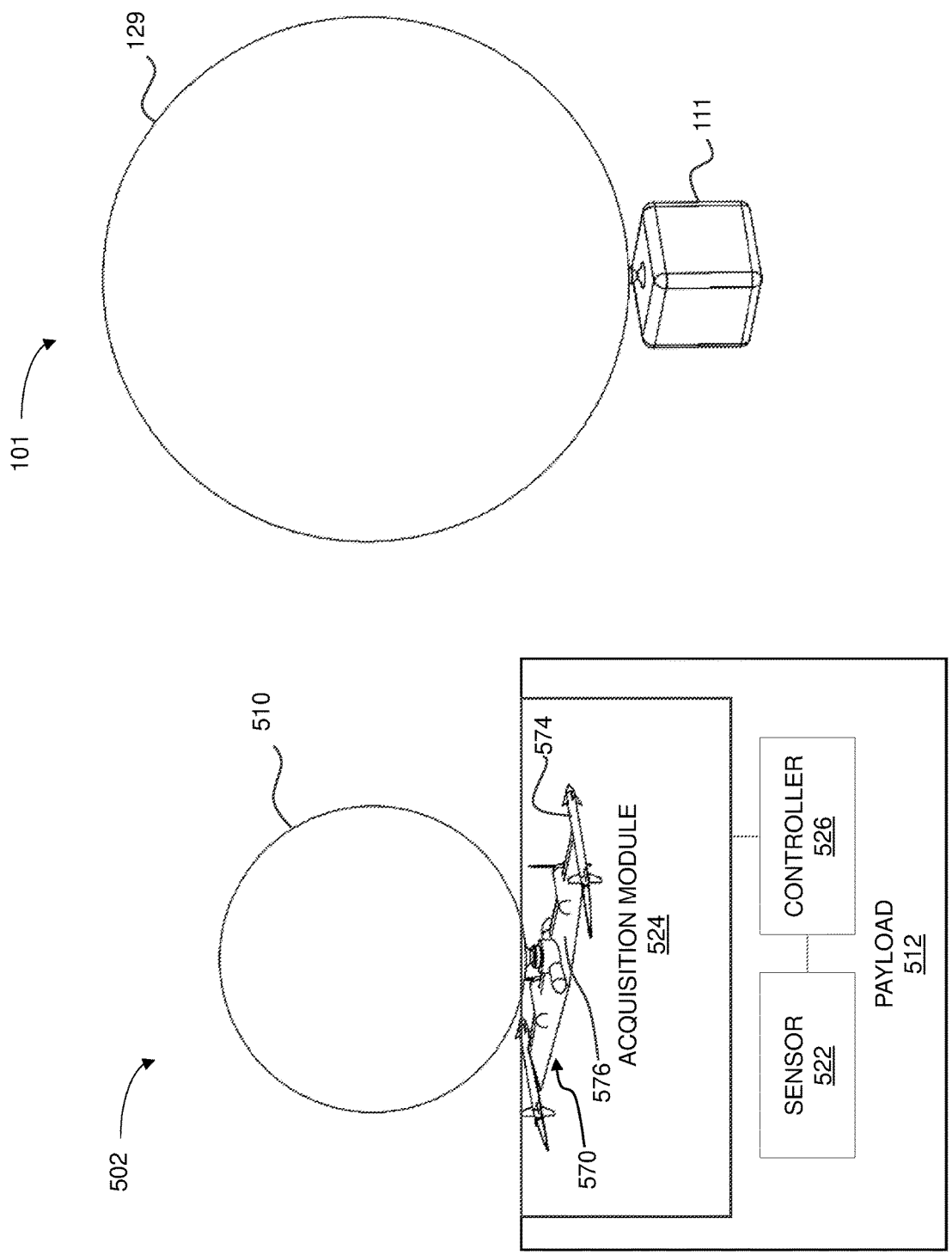
FIG. 5 is a schematic representation of an aerostat for acquisition of an aerial platform deployed in midair and approaching an aerial platform to be acquired, the aerostat including an inflatable structure and a drone with a secondary payload actuatable from the drone to the aerial platform to interrupt independent flight of the aerial platform in midair. Like reference symbols in the various drawings indicate like elements.

Referring now to FIG. 5, an aerostat 502 may include an inflatable structure 510 and a payload 512, with the payload 512 mechanically coupled to the inflatable structure 510. The payload 512 may include a sensor 522, an acquisition module 524, and a controller 526. The controller 526 may be in electrical communication with the sensor 522 and the acquisition module 524. The acquisition module 524 may include a projectile, such as a drone 570. Further, or instead, the drone 570 may include a secondary payload 574 actuatable from the drone 570 to the aerial platform 101 such that the secondary payload 574 interrupts independent flight of the aerial platform 101 relative to the drone 570. As an example, the drone 570 may include a fixed wing 576, and the secondary payload 574 may be at least partially mounted on the fixed wing 576.

In general, the secondary payload 574 may include any one or more of the various different penetrating devices and/or projectiles described herein. Thus, for example, the secondary payload 574 may include one or more secondary projectiles launchable from the drone 570 to the aerial platform 101. The secondary projectiles of the secondary payload 574 may be tethered to the drone 570 and launchable from the drone 570 to establish mechanical communication between the drone 570 and the aerial platform 101. Further, or instead, the secondary payload 574 may include a net. Still further, or instead, the secondary payload 574 may include any one or more of the various different lasers described herein (e.g., with the secondary payload 574 mounted on the wing such that the laser is controllable to direct a cutting beam at the aerial platform 101 in front of the drone 570, higher than the drone 570, lower than the drone 570, left of the drone 570, and/or right of the drone 570). Carrying such penetrating devices and/or projectiles as the secondary payload on the drone 570 may facilitate more reliable and effective engagement of the penetrating devices and/or projectiles with the aerial platform 101. That is, as part of the secondary payload 574 carried by the drone 570, the penetrating devices and/or projectiles of the secondary payload 574 may be deployed at a closer distance to the aerial platform 101, thus increasing the likelihood of acquiring the aerial platform 101 as compared to launching comparable penetrating devices and/or projectiles from the aerostat 502.

While single instances of aerostats have been described for acquiring aerial platforms, it shall be appreciated that additional instances of aerostats may be used in various use cases. For example, a plurality of instances of aerostats may be deployed at once to seed an area to facilitate acquiring an aerial platform. Such seeding may be particularly practical in view of the low-cost of the aerostats described herein, and the relative ease of launching multiple instances of the aerostats described herein.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An aerostat comprising:
an inflatable structure defining a volume; and
a payload mechanically coupled to the inflatable structure, the payload including a sensor, an acquisition module, and a controller, the acquisition module operable to generate acquisition energy directable in midair from the payload to an aerial platform flying independently, the controller in electrical communication with the acquisition module and the sensor, the controller configured, based on a signal received from the sensor and associated with flight of inflatable structure, to operate the acquisition module to direct the acquisition energy to the aerial platform such that independent flight of the aerial platform is interruptible by the acquisition energy.

2. The aerostat of claim 1, wherein the controller is mechanically coupled to the inflatable structure.

3. The aerostat of claim 1, wherein the acquisition module includes a penetration device operable to generate acquisition energy transferrable to the aerial platform in midair.

4. The aerostat of claim 3, wherein the penetration device includes a source of electromagnetic radiation actuatable by the controller to generate acquisition energy including electromagnetic radiation from the source of electromagnetic radiation.

5. The aerostat of claim 4, wherein the acquisition module further includes a servo-controlled platform, the penetration device is supported on the servo-controlled platform, and the controller configured to operate the acquisition module includes the controller configured to actuate the servo-controlled platform to change an orientation of the penetration device based on the signal from the sensor.

6. The aerostat of claim 5, wherein the sensor includes a targeting camera, and the signal from the sensor includes image information from the targeting camera.

7. The aerostat of claim 4, wherein the source of electromagnetic radiation includes a laser, and the electromagnetic radiation from the source of electromagnetic radiation includes a cutting beam.

8. The aerostat of claim 1, wherein the payload further includes a power supply electrically coupled to the sensor, the controller, and the acquisition module.

9. The aerostat of claim 8, wherein the power supply includes a capacitor bank chargeable prior to lofting the aerostat.

10. The aerostat of claim 1, wherein the acquisition module includes a projectile, and the acquisition energy includes energy launching the projectile to the aerial platform flying independently.

11. The aerostat of claim 10, further comprising a tether, wherein the projectile is in mechanical communication with the inflatable structure via the tether, and launching the projectile to the aerial platform mechanically couples the inflatable structure to the aerial platform.

12. The aerostat of claim 10, wherein the projectile includes a drone launchable from the inflatable structure to the aerial platform flying independently of the inflatable structure.

13. The aerostat of claim 12, wherein the controller configured to operate the acquisition module includes the controller configured to control operation of the drone at least after launching of the drone away from the inflatable structure and toward the aerial platform.

14. The aerostat of claim 13, wherein the controller configured to operate the acquisition module includes the controller configured to further control operation of the drone before launching the drone away from the inflatable structure and toward the aerial platform.

15. The aerostat of claim 14, wherein the drone includes at least one propeller, and the drone is guidable toward the aerial platform flying independently of the inflatable structure with the at least one propeller of the drone is engageable with the aerial platform.

16. The aerostat of claim 12, further comprising a secondary payload supported on the drone, the secondary payload actuatable from the drone to the aerial platform with the secondary payload interrupting the independent flight of the aerial platform relative to the drone.

17. The aerostat of claim 16, wherein the secondary payload includes one or more secondary projectiles launchable from the drone to the aerial platform.

18. The aerostat of claim 17, wherein the one or more secondary projectiles are tethered to the drone and launchable from the drone to establish mechanical communication between the drone and the aerial platform.

* * * * *